(12) United States Patent
Moore et al.

(10) Patent No.: US 7,691,913 B2
(45) Date of Patent: Apr. 6, 2010

(54) RIGID POLYURETHANE FOAM BASED ON TOLUENE DIAMINE-INITIATED POLYOLS

(75) Inventors: Stanley E. Moore, Lake Jackson, TX (US); Charles A. Martin, II, Pearland, TX (US); James P. Cosman, Sarnia (CA); Geoffrey H. Dean, Taegerwilen (CH); Christiaan J. Kind, Terneuzen (NL)

(73) Assignee: Dow Global Technologies, Inc., Midland, MI (US)

( * ) Notice: Subject to any disclaimer, the term of this patent is extended or adjusted under 35 U.S.C. 154(b) by 412 days.

(21) Appl. No.: 10/575,774

(22) PCT Filed: Oct. 28, 2004

(86) PCT No.: PCT/US2004/035998

§ 371 (c)(1),
(2), (4) Date: Jan. 8, 2007

(87) PCT Pub. No.: WO2005/044889

PCT Pub. Date: May 19, 2005

(65) Prior Publication Data

US 2007/0208095 A1    Sep. 6, 2007

(51) Int. Cl.
*C08G 18/32* (2006.01)

(52) U.S. Cl. .............. 521/167; 252/182.26; 252/182.27; 521/128; 521/129; 521/130; 521/131; 521/170; 521/174

(58) Field of Classification Search ................. 521/128, 521/129, 130, 131, 167, 170, 174; 252/182.26, 252/182.27
See application file for complete search history.

(56) References Cited

U.S. PATENT DOCUMENTS

| | | | |
|---|---|---|---|
| 4,469,822 A | 9/1984 | Stolz et al. | |
| 4,562,290 A | 12/1985 | Korczak et al. | |
| 5,141,968 A | 8/1992 | Dietrich et al. | |
| 5,677,359 A | 10/1997 | White, III et al. | |
| 5,895,792 A | 4/1999 | Rotermund et al. | |
| 6,831,110 B2* | 12/2004 | Ingold et al. | 521/128 |
| 6,846,850 B2* | 1/2005 | Schilling et al. | 521/174 |
| 7,008,974 B2* | 3/2006 | Cho et al. | 521/130 |

FOREIGN PATENT DOCUMENTS

| | | |
|---|---|---|
| DE | 4232970 A1 | 4/1994 |
| WO | WO-98/20061 A | 5/1998 |

* cited by examiner

*Primary Examiner*—John Cooney

(57) ABSTRACT

Rigid polyurethane foams are made using a polyol component that includes toluene diamine-initiated polyols containing specified levels of oxyethylene groups. Foams made from these polyols have low k-factors and excellent demold expansion values.

17 Claims, No Drawings

RIGID POLYURETHANE FOAM BASED ON TOLUENE DIAMINE-INITIATED POLYOLS

The present invention relates to formulations and methods for rigid polyurethane foams, particularly pour-in-place foams such as are used as thermal insulation in appliances and other applications.

Rigid polyurethane foams are commonly used as thermal insulating materials in appliances such as refrigerators, freezers or coolers, or as insulation for roofs and walls, and in other applications. An advantage that polyurethane foams possess in these applications is their ability to be formed in situ by reacting and foaming a polyurethane reaction mixture in the space where insulation is desired. The resulting rigid foam exhibits goods thermal insulation properties and often provides some structural benefits as well.

Pour-in-place polyurethane foam formulations must satisfy several demands. The reacting formulation must be capable of completely filling the available space before the polymerization reaction is completed, using small amounts of raw materials, yet provide a foam with good thermal insulating properties. In addition, it is desirable that the formulation cures quickly to form a dimensionally-stable foam. Rapid cure to a dimensionally stable state allows manufacturing times and costs to be reduced. In addition, thermal insulating properties, commonly referred to as k-factor, correlate to some extent with rapid initial reaction (gel time) of the foam formulation.

Foam formulations of this type generally include a polyisocyanate component, a polyol component that is reactive with the polyisocyanate, a blowing agent, one or more surfactants and usually a catalyst. The polyol component is generally a material, or mixture of materials, having an average hydroxyl number of 300-600 and an average of three or more hydroxyl groups/molecule. Occasionally, an amino alcohol that has both hydroxyl groups and primary or secondary amine groups can form all or part of the polyol component.

Toluene diamine (TDA)-initiated polyols have been studied for use in these polyurethane applications. Propylene oxide has been added to toluene diamine to form a polyol of 300-600 hydroxyl number. These polyols have been found to be extremely viscous-so much so that they are very difficult to process consistently and reliably on commercial scale equipment. Further, the high pressures needed to process these polyols on foam equipment reduces equipment life and maintenance costs. As a result, there have been various attempts to produce a lower-viscosity product by reacting TDA with mixtures of ethylene oxide and propylene oxide. TDA-initiated-polyol products having a viscosity of under 5000 mPa·S have been produced successfully in this way.

In recent years, as concerns over ozone depletions have escalated, traditional chlorofluorocarbon (CFC) and hydrochlorofluorocarbon (HCFC) blowing agents have been phased out in favor of alternative blowing agents that have lower ozone depletion potentials and in many cases lower global warming potentials. Carbon dioxide (generated in a reaction of water and an isocyanate) various hydrofluorocarbons, various hydrocarbons, and mixtures of these are now the replacement blowing agents of choice. However, these are not as efficient thermal insulators as the CFC and HCFC materials. Of example, CFC-11 and HFC-141b have thermal conductivities of 0.054 and 0.066 BTU/hr-in-° F. at 77, respectively, whereas that of HFC-134a is 0.106 and that of HFC245fa is 0.096. Despite this fact, governmental and/or industry standards often require that appliances containing these foams meet the same standards for thermal insulation as existed before. This means that foam formulations need to be optimized to provide the requisite thermal insulation notwithstanding the use of less efficient blowing agents. The problem is further compounded because these alternative blowing agents are seldom drop-in replacements for the CFCs and HCFCs. Due to variations in their molecular weights, boiling temperatures, solubilities and other properties, the substitution of the newer blowing agents almost always requires that other formulation adjustments be made.

Accordingly, it is desirable to provide a polyurethane foam formulation that can be processed easily to high quality rigid thermal insulating foam, which uses certain hydrofluorocarbon and/or hydrocarbon blowing agents.

In one aspect, this invention is a method of making a polyurethane foam, comprising (1) forming a reaction mixture by mixing, under reaction conditions, (a) an isocyanate-reactive component containing a polyol or mixture thereof having an average hydroxyl number of from 300 to 600 and an average of at least 3 hydroxyl groups/molecule with (b) an isocyanate-component containing a polyisocyanate that is reactive with the polyol or mixture thereof, in the presence of an effective amount of physical blowing agent selected from the group consisting of hydrofluorocarbons having from 2 to 4 carbon atoms, alkanes having 3-6 carbon atoms and cycloalkanes having 5-6 carbon atoms, or a mixture of any two or more of the foregoing physical blowing agents, and from 0.1 to 4 parts by weight water per 100 parts by weight of the polyol or mixture thereof, and (2) subjecting the reaction mixture to conditions such that it reacts, expands and cures within an enclosed space to form a rigid polyurethane foam within said enclosed space, wherein at least 10 percent by weight of said polyol or mixture thereof is one or more hydroxyl group containing, toluene diamine-initiated polyethers, wherein the toluene diamine-initiated polyether(s) have an average hydroxyl number of from 300 to 600, and further wherein oxyethylene ($-CH_2-CH_2-O-$) groups constitute 2 to 25 percent, preferably 2 to 20 percent of the total weight of the toluene diamine initiated polyether(s).

In a second aspect, this invention is an isocyanate-reactive composition comprising (a) an isocyanate-reactive component containing a polyol or mixture thereof having an average hydroxyl number of from 300 to 600 and an average of at least 3 hydroxyl groups/molecule, (b) an effective amount of a physical blowing agent selected from the group consisting of hydrofluorocarbons having from 2 to 4 carbon atoms, alkanes having 3-6 carbon atoms and cycloalkanes having 5-6 carbon atoms, or a mixture of any two or more of the foregoing physical blowing agents and (c) from 0.1 to 4 parts by weight water per 100 parts by weight of the polyol or mixture thereof, wherein at least 10 percent by weight of said polyol or mixture thereof is one or more hydroxyl group containing toluene diamine-initiated polyethers, the toluene diamine-initiated polyether(s) have an average hydroxyl number of from 300 to 600, and oxyethylene groups constitute 2 to 25 percent, preferably 2 to 20 percent of the total weight of the toluene diamine initiated polyether(s).

The isocyanate-reactive component includes one or more polyols that, taken together, have an average hydroxyl number of 300 to 600, preferably from 400 to 600. Toluene diamine (TDA)-initiated polyether(s) may constitute only a minor portion (10-49 percent) of the total weight of the polyols. However, the benefits of this invention are more clearly seen when the TDA-initiated polyether(s) constitute at least 50 percent of the total weight of the polyols. The TDA-initiated polyether(s) preferably constitute at least 70 percent, more preferably at least 75 percent, even more preferably at least 80 percent of the total weight of the polyols. The TDA-initiated polyether(s) may constitute as much as 90 percent, 95 percent, 98 percent or 100 percent of the total weight of the polyols.

The TDA-initiated polyether(s) contain oxyethylene groups, which constitute from 2, preferably from 3, more preferably from 5, even more preferably from 6, to 25, preferably to 20, more preferably to 17, even more preferably to 15, and in some applications 12 percent of the total weight of the TDA-initiated polyethers.

When oxyethylene groups appear at the end of a polyether chain, they form primary hydroxyl groups. In these applications, it is preferred that the terminal hydroxyl groups are mainly secondary hydroxyls. Secondary hydroxyl groups can be formed by "capping" the polyether with a higher 1,2-alkylene oxide such as propylene oxide or butylene oxide. Thus, the TDA-initiated polyethers used herein are preferably polyethers having internal poly(oxyethylene) blocks, or internal randomly copolymerized EO/PO (ethylene oxide/propylene oxide) blocks, that are capped with an all-PO block to provide mostly terminal secondary hydroxyl groups. It is preferred that at least 50 percent, more preferably at least 80 percent, even more preferably at least 90 percent, especially at least 95 percent of the hydroxyl groups are secondary. The ratios of ethylene oxide and propylene oxide are such that the oxyethylene content and hydroxyl number are both within the aforementioned ranges.

The TDA-initiated polyether (or mixture) advantageously has a viscosity of less than 10,000 cps at 50° C., preferably less than 5000 cps at 50° C. and especially less than 3000 cps at 50° C.

It is within the scope of the invention to use a blend of TDA-initiated polyethers, in which one or more of the individual components falls outside the aforementioned oxyethylene group content, provided that the average polymerized ethylene oxide content of the blend is within the oxyethylene content and hydroxyl number ranges mentioned before. For example, it is possible to use a blend of an all-PO adduct of TDA with another TDA-initiated polyol having oxyethylene groups, provided that the oxyethylene content and hydroxyl number of the blend is within the ranges stated before. In such cases, one of the TDA-initiated polyethers in the blend may contain a somewhat greater proportion of oxyethylene groups than stated above, again provided that the average oxyethylene content and hydroxyl number of the blend falls within the stated ranges. For example, an all-PO adduct of TDA may be blended with a TDA-initiated polyol having 21-50 percent, preferably 30-40 percent by weight oxyethylene groups, provided that the component ratios are such that the total content of oxyethylene groups is between 2 and 25 percent, preferably between 2 and 20 percent by weight of the blend. It is generally preferred not to use any individual TDA-initiated polyol with an oxyethylene content of greater than 50 percent, especially greater than 40 percent, in such blends, as this tends to introduce a significant proportion of primary hydroxyl groups.

The TDA-initiated polyol(s) are conveniently prepared in known manner, by adding ethylene oxide and another alkylene oxide (preferably propylene oxide) to toluene diamine under polymerization conditions. Suitable polymerization methods are described in DE 42 32 970 A1, U.S. Pat. No. 4,562,290 and U.S. Pat. No. 4,209,609, all incorporated by reference. In general, the TDA-initiated polyether is prepared by first reacting TDA with ethylene oxide or an EO/PO mixture, following by further reaction with additional PO. These polymerizations may be catalyzed if desired, but it is usually unnecessary to catalyze the EO polymerizations or EO/PO copolymerizations. Suitable polymerization temperatures are from 70-150 C. Suitable polymerization catalysts include alkali metal hydroxides, alkaline earth hydroxides, so-called double metal cyanide catalysts, and tertiary amines. To produce a TDA-initiated polyether having 2-20 percent internally polymerized EO and a hydroxyl number of 300-600, from 0.18-3.4 moles of EO and from 3.1 to 8.1 moles of PO are polymerized per mole of TDA.

The TDA may be 2,3-TDA, 2,4-TDA, other isomers, or mixtures of such isomers. The TDA is preferably 2,3-TDA or a blend containing at least 50, preferably at least 80 percent, more preferably at least 90 percent, even more preferably at least 95 percent by weight 2,3-TDA with the balance being other TDA isomers, such as 2,6- and 2,4-TDA isomers, and/or impurities.

The TDA-initiated polyols may be blended with other polyols, provided the polyol mixture has an average hydroxyl number of from 300 to 600 and the polyol blend has on average 3 or more hydroxyl groups per molecule. Suitable such polyols include polyether polyols having from 3-8 hydroxyl groups/molecule, and polyester polyols. Polyether polyols may be amine-initiated, such as ethylene diamine-initiated, or may be initiated with poly(hydroxyl) compounds such as sugars (for example sucrose), glycerine, and trimethylolpropane. Sucrose/glycerine-initiated polyether polyols are of particular interest. Polyester polyols are typically difunctional; as such they preferably do not constitute greater than 25 percent, especially 15 percent of the total weight of all polyols.

The polyisocyanate component includes a polyisocyanate compound or mixture thereof, having an average of two or more, preferably an average of 2.5-4.0, isocyanate groups/molecule. The polyisocyanate compound may be aromatic, aliphatic or cycloaliphatic. Examples of suitable polyisocyanates are toluene-2,4-diisocyanate, toluene 2,6-diisocyanate, hexamethylene-1,6-diisocyanate, tetramethylene-1,4-diisocyanate, cyclohexane-1,4-diisocyanate, hexahydrotolylene diisocyanate (all isomers), naphthylene-1,5-diisocyanate, 1-methoxyphenyl-2,4-diisocyanate, diphenylmethane-4,4'-diisocyanate, diphenylmethane-2,4'-diisocyanate, 4,4'-biphenylene diisocyanate, 3,3'-dimethoxy-4,4'-diphenyl diisocyanate, 3,3'-dimethyldiphenylpropane-4,4'-diisocyanate, polymethylene and polyphenylisocyanates (commonly known as polymeric MDI). Polymeric MDI is particularly suitable due to its high functionality, ready availability, low volatiles content and low cost. In addition to the foregoing polyisocyanates, prepolymers and quasi- (or semi-) prepolymers thereof are useful.

A combination of water and a physical blowing agent are used to make the foam. Water produces carbon dioxide by reacting with the polyisocyanate compound; for that reason enough polyisocyanate compound must be provided to react with the water. From 0.1 to 4 parts of water are provided for each 100 parts by weight of the polyol mixture. A preferred amount of water is from 1.0 to 3.25 parts. A more preferred amount of water is 1.5 to 5 parts. An especially preferred amount is 1.4 to 2.25 parts.

The physical blowing agent is one or more hydrofluorocarbons (HFC) having from 2 to 4 carbon atoms, alkanes having 3-6 carbon atoms and/or cycloalkanes having 5-6 carbon atoms. Mixtures of these can be used. Thus when a HFC or mixture of HFCs is the main blowing agent, the HFC may contain one or more hydrocarbons. Conversely, when a hydrocarbon or mixture of hydrocarbons is the main blowing agent, the hydrocarbon may contain one or more HFCs. Among the suitable hydrofluorocarbon (HFC) blowing agents are HFC-125 (1,1,1,2,2-pentafluoroethane), HFC-134A (1,1,1,2-tetrafluoroethane, HFC-143 (1,1,2-trifluoroethane), HFC 143A (1,1,1-trifluoroethane), HFC-152 (1,1-difluoroethane), HFC-227ea (1,1,1,2,3,3,3-heptafluoropropane), HFC-236ca (1,1,2,2,3,3-hexafluoropropane), HFC 236fa (1,1,1,3,3,3-hexafluoroethane), HFC 245ca (1,1,2,2,3-pentafluoropentane), HFC 356mff (1,1,1,4,4,4-hexafluorobutane) and HFC-365mfc (1,1,1,3,3-pentafluorobutane). Of particular interest among the hydrofluorocarbons are HFC 134A, HFC 245fa, HFC 365mfc and mixtures thereof. Useful alkane and cycloalkane blowing agents include n-butane, isobutane, n-pentane, isopentane, n-hexane, isohexane, cyclopentane, and cyclohexane. Cyclopentane, n-pentane and isopentane are preferred among the hydrocarbon blowing agents.

The physical blowing agent is used in an amount such that, in combination with the carbon dioxide produced in the water-isocyanate reaction, a foam of a desirable density is formed. In the usual case, the desired foam density will be in the range from 1.25 to 6 pounds/cubic foot, preferably from 1.5 to 4 pounds/cubic foot, especially from 1.6 to 2.3 pounds/cubic foot. In addition, the amount of physical blowing agent is preferably selected so that the physical blowing agent constitutes 40-90 mole-percent, preferably 50-80 mole-percent, especially 60-80 mole-percent, of the combined number of moles of water and physical blowing agent provided in the foam formulation. To meet these parameters, from 15 to 40, more typically from 20 to 35 parts by weight physical blowing agent are generally provided per 100 parts of polyol mixture.

The foam formulation may also contain auxiliary additives that promote the formation of a good quality, stable foam. Such additives include, for example, catalysts, surfactants, and pigments. Suitable catalysts include the well known polyurethane catalysts such as are described at column 6 of U.S. Pat. No. 5,817,860, incorporated herein by reference. It is generally preferred to use a mixture of at least one catalyst that promotes the reaction of water with a polyisocyanate, and at least one other catalyst that promotes the reaction of the polyol(s) with the polyisocyanate. A catalyst that promotes the trimerization reaction of isocyanates to form isocyanurate groups may also be used, and is preferred when the isocyanate index is greater than 1.2.

Such catalysts include salts and chelates of tin, zinc, bismuth, iron, and mercury, as well as tertiary amine compounds. Organotin catalysts such as stannous octoate, stannous oleate, stannic chloride, dimethyltin dilaurate and dibutyltin dilaurate are preferred metallic catalysts. Suitable tertiary amine catalysts include triethylenediamine (which is commercially available as a 33 percent by weight solution), trimethylamine, triethylamine, N-methylmorpholine, N-ethylmorpholine, N-coco-morpholine, 1-methyl-4-dimethylaminoethyl piperazine, 3-methoxy-N-dimethylpropyl amine, N,N-dimethyl-N',N'-methylisopropyl propylenediamine, N,N'-diethylaminopropylamine, N,N-dimethylbenzylamine, N,N-dimethylethanolamine, N,N-dimethylpiperazine, 1,4-diazobicyclo[2,2,2]octane, bis(dimethylaminoethyl)ether, bis(2-dimethylaminoethyl)ether, morpholine, N,N-dimorpholine diethylether, N,N-dimethylcyclohexylamine, 4,4'-(oxydi-2,1-ethanediyl) bis, and pentamethylene diamine. The catalyst is conveniently dissolved or dispersed in the isocyanate-reactive component or the isocyanate component.

The amount of catalyst is selected to provide a desired reaction rate. Sufficient catalyst to provide a gel time (per the test described below) of 15-50 seconds, preferably from 25-40 seconds, more preferably from 28-35 seconds is desirable in most applications.

The foam formulation will in most cases include a surfactant. Suitable surfactants include the well-known silicone surfactants, as well as nonionic polyether surfactants. The silicone surfactants include commercially available polysiloxane/polyether copolymers such as Tegostab (trademark of Goldschmidt Chemical Corp.) B-8462 and B-8404, Niax (trademark of GE Silicones) L-6900 and L-6910 surfactants, and DC-198 and DC-5043 surfactants available from Dow Corning. The surfactant is used to stabilize the cellular structure of the foaming reaction mixture until it has hardened. Nonionic polyether surfactants include ethylene oxide/propylene oxide and ethylene oxide/butylene oxide block copolymers. It is less preferred to use anionic or cationic surfactants. Typically the surfactant is used at levels of 0.5 to 4 parts, especially from 1.5 to 3 parts, per 100 parts by weight of the polyol mixture. As with the catalyst, the surfactant can be incorporated into either the isocyanate-reactive component or the isocyanate component, or both, but is most typically incorporated into the isocyanate-reactive component.

Other optional components of the foam formulation include fillers such as talcs, clays, silicas, calcium carbonates, graphites, glass, carbon black, and plastic powders such as ABS; fibers such as glass or other ceramics, carbon, metals, or polymers such as polyamide (that is, Kevlar), propylene; colorants; biocides, and preservatives.

The foam of the invention is conveniently made by mixing the polyol component and the isocyanate component in the presence of the blowing agents, under conditions such that the polyols and polyisocyanate(s) react and cure and the blowing agents simultaneously generate gases to expand the reacting mixture. It is not usually necessary to pre-heat the components or apply heat to the reaction mixture in order to obtain a good reaction and cure. However, heating may be used if desired.

The ratios of the components are advantageously selected so as to provide an isocyanate index (ratio of NCO groups to isocyanate-reactive groups in the polyols and water) of 0.7, preferably 0.9, more preferably 0.98, to 3.0, preferably to 1.5, more preferably to 1.25, especially to 1.1.

As an important application for these foams is in thermal insulating applications, in the usual foam manufacturing process the foam formulation will be mixed and placed into an enclosed space where thermal insulation is needed. The formulation then reacts and expands to form the foam in situ. The walls forming the enclosed space may be heated if desired to promote cure and/or adhesion of the foam to the walls. The walls defining the enclosed space are usually held in place mechanically, using a jig or other apparatus, until the foam formulation has reacted sufficiently that it is dimensionally stable and can be demolded.

In most thermal insulating applications, it is desired to employ enough of the foam formulation to form a good-quality, closed cell foam that cures in a short time to become dimensionally stable. This is often achieved by determining the minimum amount of the foam formulation that is needed to just fill the enclosed space, and using a slightly greater amount, such as 5-20 percent, especially 7-15 percent more, of the foam formulation to fill the part and make the foam. This "overpacking" helps ensure that the enclosed space is completely filled and reduces the time the formulation needs to cure to produce a foam that is dimensionally stable enough that it can be "demolded" by releasing the enclosing walls from their mechanical constraints.

The demold time, then, is determined by the time needed for the foam to be sufficiently dimensionally stable, and is desirably from 1 minute to less than 5 minutes, preferably from 2-3.5 minutes, especially from 2-3 minutes.

A standard method of evaluating ability of a foam formulation to cure to a dimensionally stable state is to measure the amount of expansion the foam exhibits when demolded at a fixed time. A typical test is to mold a foam in a standard mold commonly referred to as a Brett mold, allow it to cure for three minutes (or other predetermined time) and then release the restraints on the mold so that any further foam expansion causes the mold to open. The amount by which the mold opens is a measure of the post-demold expansion of the foam. In this test, the demold expansion is desirably less than 0.1 inch, preferably less than 0.05 inch, even more preferably 0.03 inch or below.

The cured foam preferably exhibits a k-factor of less than 0.150, more preferably less than 0.140, even more preferably 0.135 or less, especially 0.132 BTU-in/ft$^2$-hr-° F. or less. K-factors as low as 0.125, more typically as low as 0.128 BTU-in/ft$^2$-hr-° F. are obtainable in some cases through optimization. The k-factor of the foam will depend on various factors, including the selection of blowing agent(s), cell size, and the reactivity of the formulation (expressed as gel time).

Examples of specific applications for the foam formulation of the invention include thermal insulating applications such as in coolers, freezers, refrigerators, roofs, walls, and decking. The foam formulation can be used to create thermal insulation panels that may or may not contain facing sheets.

The foam formulation of the invention can also be used in free-rise applications.

The following examples are provided to illustrate the invention, but are not intended to limit the scope thereof. All parts and percentages are by weight unless otherwise indicated.

The following polyols are used in the following examples and comparative examples:

Polyol A. A TDA-initiated polyol made by first reacting 54 parts of o-TDA with a mixture of 17.5 parts EO and 79.6 parts PO at 125° C. for 4 hours. Dimethylethylamine (2.66 parts) is then added, and 65.7 parts of PO are fed at 125° C. After the reactor pressure becomes constant at 3.7 bar, 1.33 parts of additional dimethylethylamine are added and the mixture digested overnight at 125° C. Residual PO is removed via a nitrogen purge. The resulting polyol contains 8 percent oxyethylene groups and has a hydroxyl number of about 456.

Polyol B. A TDA-initiated polyol made in the general manner as described for Polyol A, except EO/PO ratios are changed to produce a polyol containing 17 percent oxyethylene groups and having a hydroxyl number of about 430.

Polyol C. A TDA-initiated polyol containing 35 percent oxyethylene groups and having a hydroxyl number of about 390.

Polyol D. A TDA-initiated, poly(propylene oxide) polyol having no oxyethylene groups and a hydroxyl number of 430.

Polyol E. A 360 OH-number poly(propylene oxide) polyol initiated from a sucrose/glycerine mixture.

Polyol F. A di-functional aromatic polyester polyol having an OH number of ~300.

Polyol G. A trifunctional poly(propylene oxide) polyol having an OH number of 170.

Polyol H. A four-functional, ethylene diamine-initiated poly(propylene oxide) polyol having an OH number of 640.

EXAMPLES 1-3 AND COMPARATIVE EXAMPLES C1 AND C2

Rigid polyurethane foam Examples 1-3 and Comparative Examples C1 and C2 are prepared from foam formulations as set forth in Table 1.

TABLE 1

|  | Ex. 1 | Ex. 2 | Ex. 3 | C1 | C2 |
|---|---|---|---|---|---|
| Isocyanate-Reactive Component (parts by weight) | | | | | |
| Polyol A | 100 | 80 | 80 | 0 | 0 |
| Polyol C | 0 | 0 | 0 | 0 | 100 |
| Polyol D | 0 | 10 | 0 | 100 | 0 |
| Polyol E | 0 | 10 | 10 | | |
| Polyol F | 0 | 0 | 10 | | |
| Catalyst Mixture[1] | 2.00 | 2.30 | 2.40 | 2.55 | 2.55 |
| Surfactant[2] | 2.5 | 2.5 | 2.5 | 2.0 | 2.0 |
| Water | 1.95 | 2.88 | 1.27 | 2.46 | 2.47 |
| HFC-245fa | 33.85 | 32.90 | 37.20 | 27.47 | 27.58 |
| Mole Ratio, HFC-245fa/Water | 70/30 | 70.2/29.8 | 80/20 | 60/40 | 60/40 |
| Isocyanate Component | | | | | |
| Polymeric MDI[3] | 142.44 | 134.54 | 132.09 | 167.97 | 155.33 |
| Isocyanate Index | 1.05 | 1.10 | 1.10 | 1.20 | 1.20 |
| Ratio[4] | 1.015 | 0.96 | 0.917 | 1.249 | 1.154 |

[1]Mixture of pentamethylethylene diamine (Polycat ™ 5, from Air Products and Chemicals) dimethylcyclohexyl amine (Polycat ™ 8. from Air Products and Chemicals and dimethylcyclohexyl amine, potassium salt in diethylene glycol (Polycat ™ 46, from Air Products and Chemicals);
[2]Niax ™ L-6900 silicone surfactant, from GE Silicones;
[3]Polymeric MDI with a functionality of about 2.7 and an isocyanate equivalent weight of 134;
[4]Weight ratio of isocyanate component to isocyanate-reactive component.

Foams are prepared and tested as follows. Free rise density and gel time are determined by mixing 600-800 grams of the foam formulation, pouring it into a plastic bag, and allowing the foam to expand unrestrained. Gel time is determined from the time the isocyanate-reactive and isocyanate components are mixed until the mixture forms strings when a wooden tongue depressor is touched to the mixture and pulled away. Free rise density is measured on a core sample according to ASTM-D-1622, k-factor, minimum fill density, compressive strength and demold expansion are measured from foam made in a standard 5×20×200 cm, hinged, two-piece Brett mold. The hinge is along one 200 cm side. Minimum fill density is measured by foaming enough of the foam formulation within the mold to fill about 95 percent of the mold volume. The weight of the foam formulation, divided by the volume of the foam, is given as the minimum fill density. k-factor, compressive strength and demold expansion are taken from foam samples made in the Brett mold with 10 percent overpacking, and measured according to ASTM C-518 and D-1621, respectively. Demold expansion is measured by releasing the pressure on a 10 percent overpacked Brett mold 3 minutes after the isocyanate-reactive and isocyanate components are mixed, and measuring the amount which the mold opens on the 200 cm side opposite the hinge.

Results are as indicated in Table 2.

TABLE 2

| Property, units | Ex. 1 | Ex. 2 | Ex. 3 | C1 | C2 |
|---|---|---|---|---|---|
| Geltime, seconds | 38 | 32 | 30 | 33 | 35 |
| k-factor, 10 percent overpacked, BTU-in/ft$^2$-hr-° F. (W m$^{-1}$ K$^{-1}$) | 0.132 (0.0190) | 0.131 (0.0189) | 0.130 (0.0187) | 0.131 (0.0189) | 0.139 (0.0200) |
| Free rise density, pcf (kg/m$^3$) | 1.42 (22.75) | 1.33 21.30) | 1.37 (21.95) | 1.49 (23.87) | 1.16 (18.58) |
| Minimum Fill Density, pcf (kg/m$^3$) | 1.87 (29.95) | 1.75 (28.03) | 1.87 (29.95) | 1.89 (30.27) | 1.81 (28.99) |
| Compressive Strength, psi (kPa) | 16.22 (111.82) | 17.14 (118.18) | 18.07 (124.59) | 17.90 (123.42) | 17.90 (123.42) |
| Demold expansion, 3 min @ 10 percent overpacking, inches | 0.016 | 0.011 | 0.049 | 0.003 | 0.090 |

Comparative Sample C1 is illustrative of the good quality foam that can be obtained using an all-PO, TDA-initiated polyol. The foam has an excellent k-factor of 0.131 and exhibits very minimal demold expansion. Generally, k-factor tends to improve with reduced gel time (other factors being equal) at a rate of an improvement of 0.001 units for each 3 second reduction in gel time. By increasing catalyst levels slightly to reduce the gel time for Example C1, a k-factor of 0.130 can be expected, with minimal effect on other properties. As is well-known, however, all PO, TDA-initiated polyols are too viscous to be processed consistently and reliably on most commercial foaming equipment.

Comparative Sample C2 illustrates how foam properties, notably k-factor and demold expansion, deteriorate when an all-PO, TDA-initiated polyol is replaced with a TDA-initiated polyol having a high oxyethylene content. k-factor suffers significantly, even when the increased gel time is taken into account. Demold expansion increases substantially.

Example 1 illustrates how the use of an 8 percent-EO, TDA-initiated polyol produces a foam having a k-factor comparable to that of Comparative Sample C1, with minimally increased, commercially acceptable, demold expansion. As with Comparative Sample C1, optimization of the catalyst package to bring the gel time down to 30 seconds would be expected to lower the k-factor to 0.129 or 0.130. However, contrary to the all-PO, TDA-initiated polyol used in Comparative Sample C1, this formulation has a low viscosity and is easily and reproducibly processed.

The proportion of HFC-245 blowing agent is higher in Examples 1-3 than in either of the Comparative Examples. It is expected a change in the mole ratio of HFC-245 from 60 percent to 70 percent would increase k-factor by about 0.0013 units. A change in the mole ratio of HFC-245 from 60 percent to 80 percent is expected to increase the k-factor by about 0.0026 units.

Examples 2 and 3 illustrate that the low k-factors and demold expansions provided by the invention can be achieved when a portion of the TDA-initiated polyol is replaced with other non-aromatic, non-amine-containing polyols. Example 3 illustrates that this is the case even when up to 10 percent by weight of the polyol mixture is a difunctional polyol. Some deterioration of demold expansion is seen in Example 3, but this value is generally acceptable, and is much less than that of Comparative Sample C2.

EXAMPLES 4-7

Rigid polyurethane foam Examples 4-7 are prepared and evaluated as described with respect to Examples 1-3, using foam formulations as set forth in Table 3.

TABLE 3

| | Ex. 4 | Ex. 5 | Ex. 6 | Ex. 7 |
|---|---|---|---|---|
| Isocyanate-Reactive Component | | | | |
| Polyol B | 100 | 100 | 100 | 0 |
| Polyol C | 0 | 0 | 0 | 50 |
| Polyol D | 0 | 0 | 0 | 50 |
| Catalyst Mixture[1] | 2.55 | 2.35 | 2.85 | 2.55 |
| Surfactant[2] | 2.0 | 2.0 | 2.0 | 2.0 |
| Water | 2.50 | 3.0 | 1.5 | 2.47 |
| HFC-245fa | 27.8 | 23.0 | 33.0 | 27.58 |
| Mole Ratio, HFC-245fa/Water | 59.9/40.1 | 50.7/49.3 | 74.7/26.3 | 60/40 |
| Isocyanate Component | | | | |
| Polymeric MDI[3] | 161.66 | 165.79 | 144.5 | 161.74 |
| Isocyanate Index | 1.15 | 1.12 | 1.15 | 1.20 |
| Ratio[4] | 1.20 | 1.27 | 1.037 | 1.107 |

[1-4]See notes 1-4, Table 1.

The resulting foams are made and evaluated as described in Example 1, with results as indicated in Table 4:

TABLE 4

| Property units | Ex. 4 | Ex. 5 | Ex. 6 | Ex. 7 |
|---|---|---|---|---|
| Gel time, seconds | 29 | 30 | 34 | 33 |
| k-factor, 10 percent overpacked, BTU-in/ft$^2$-hr-° F. (W m$^{-1}$ K$^{-1}$) | 0.135 (0.0195) | 0.135 (0.0195) | 0.131 (0.0189) | 0.135 (0.0195) |
| Free rise density, pcf (kg/m$^3$) | 1.28 (20.50) | 1.21 (19.38) | 1.29 (20.66) | 1.29 (20.66) |
| Minimum Fill Density, pcf (kg/m$^3$) | 1.79 (28.67) | 1.74 (27.87) | 1.80 (28.83) | 1.74 (27.87) |
| Compressive Strength, psi (kPa) | 17.2 (118.59) | 17.87 (123.21) | 16.11 (111.07) | 15.53 (107.08) |
| Demold expansion, 3 min @ 10 percent overpacking, inches | 0.011 | 0.014 | 0.017 | 0.008 |

Examples 4-7 demonstrate that a TDA-initiated polyol containing a somewhat higher level of oxyethylene groups still provides a desirable combination of low k-factor and low demold expansion, particularly as compared with Example C2. The comparison between examples 4 and 7 is interesting. A blend of two TDA-initiated polyols is used in Example 7, one containing 35 percent oxyethylene groups and the other containing no oxyethylene groups. The blend contains about 17 percent oxyethylene groups, similar to that of the polyol used in Example 4. Except for some loss in compressive strength, the blend of TDA-initiated polyols performs very similarly to the single TDA-initiated polyol used in Example 4. However, Polyol D is viscous, and must be blended with Polyol C before it can be used easily in commercial foam equipment. The additional blending step adds costs and makes this approach somewhat less preferred.

EXAMPLES 8 AND 9 AND COMPARATIVE SAMPLES C3 AND C4

Rigid polyurethane foam Examples 8 and 9 and Comparative Samples C3 and C4 are prepared and evaluated as described with respect to Examples 1-3, using foam formulations as set forth in Table 5.

TABLE 5

| | Ex. 8 | Ex. 9 | C3 | C4 |
|---|---|---|---|---|
| Isocyanate-Reactive Component | | | | |
| Polyol A | 0 | 80 | 0 | 0 |
| Polyol B | 80 | 0 | 0 | 0 |
| Polyol E | 10 | 10 | 100 | 100 |
| Polyol F | 10 | 10 | 0 | 0 |
| Catalyst Mixture[1] | 2.40 | 2.40 | 4.00 | 4.40 |
| Surfactant[2] | 2.5 | 2.5 | 2.15 | 2.5 |
| Water | 1.95 | 1.95 | 2.58 | 2.4 |
| HFC-134a | 20.5 | 5.2 | 23.28 | 6.85 |
| HFC-245fa | 0 | 27.0 | 0 | 10 |
| Mole Ratio, HFC-134a/HFC-245fa/Water | 65/0/35 | 14.1/55.9/30 | 61.4/0/38.6 | 20.1/40.1/39.8 |
| Isocyanate Component | | | | |
| Polymeric MDI[3] | 140.35 | 143.24 | 137 | 146.24 |
| Isocyanate Index | 1.10 | 1.20 | 1.10 | 1.20 |
| Ratio[4] | 1.10 | 1.03 | 1.037 | 1.090 |

[1-4]See notes 1-4, Table 1.

The resulting foams are made and evaluated as described in Example 1, with results as indicated in Table 6:

TABLE 6

| Property, units | Ex. 8 | Ex. 9 | C3 | C4 |
|---|---|---|---|---|
| Gel time, seconds | 30 | 28 | 44 | 38 |
| k-factor, 10 percent overpacked, BTU-in/ft²-hr-° F. (W m⁻¹ K⁻¹) | 0.142 (0.0205) | 0.132 (0.0190) | 0.150 (0.0216) | 0.141 (0.0203) |
| Free rise density, pcf (kg/m³) | 1.43 (22.91) | 1.36 (21.79) | 1.52 (24.35) | 1.53 (24.51) |
| Minimum Fill Density, pcf (kg/m³) | 2.29 (36.68) | 1.85 (29.63) | 2.03 (32.52) | 1.86 (29.79) |
| Compressive Strength, psi (kPa) | 23.3 (160.65) | 17.3 (119.28) | 18.1 (124.80) | 16.94 (116.80) |
| Demold expansion, 3 min @ 10 percent overpacking, inches | 0.142 | 0.132 | 0.065 | 0.035 |

Examples 8 and 9 demonstrate the use of the TDA-initiated polyol with blowing agent packages that include HFC-134a. These represent nonoptimized systems. Optimization is expected to reduce the minimum fill density and demold expansion values of Example 8 and the demold expansion value of Example 9. Despite the nonoptimized formulation, very low k-factors are obtained. The Comparative Samples have significantly higher k-factors even after adjusting for differences in blowing agent composition and gel times.

EXAMPLE 10 AND COMPARATIVE SAMPLE C5

Rigid polyurethane foam Example 10 and Comparative Sample C5 are prepared and evaluated as described with respect to Examples 1-3, using foam formulations as set forth in Table 7.

TABLE 7

| | Ex. 10 | C5 |
|---|---|---|
| Isocyanate-Reactive Component | | |
| Polyol B | 15 | 0 |
| Polyol C | 0 | 13 |
| Polyol E | 60 | 40 |
| Polyol F | 10 | 20 |
| Polyol G | 10 | 20 |
| Polyol H | 5 | 7 |
| Catalyst Mixture[1] | 4.5 | 2.82 |
| Surfactant[2] | 2.5 | 2.0 |
| Cyclopentane | 16.5 | 16.0 |
| Mole ratio, cyclopentane/water | 66.89/33.11 | 66.21/33.79 |
| Isocyanate Component | | |
| Polymeric MDI[3] | 161.5 | 141.69 |
| Isocyanate Index | 1.15 | 1.15 |
| Ratio[4] | 1.286 | 1.152 |

[1-4]See notes 1-4, Table 1.

The resulting foams are made and evaluated as described in Example 1, with results as indicated in Table 8:

TABLE 8

| Property, units | Ex. 10 | C3 |
|---|---|---|
| Gel time, seconds | 35 | 40 |
| k-factor, 10 percent overpacked, BTU-in/ft²-hr-° F. (W m⁻¹ K⁻¹) | 0.143 (.0206) | 0.145 (.0213) |
| Free rise density, pcf (kg/m³) | 1.47 (23.55) | 1.35 (21.62) |
| Minimum Fill Density, pcf (kg/m³) | 2.02 (32.36) | 1.92 (30.76) |
| Compressive Strength, psi (kPa) | 16.79 (115.76) | 14.83 (122.93) |
| Demold expansion, 3 min @ 10 percent overpacking, inches | 0.072 | 0.180 |

Example 10 illustrates the use of the low-EO TDA-initiated polyols as a minor component of the polyol mixture and in a cyclopentane/water co-blown formulation. Even when the TDA-initiated polyether of the invention is used as a minor component, a significant improvement in demold expansion is seen.

EXAMPLE 11

Rigid polyurethane foam of Example 11 is prepared and evaluated as described with respect to Examples 1-2, using the foam formulation as set forth in Table 9. This example uses 35 wt percent o-TDA polyol with 8 percent EO and an equal amount of 35 wt percent EO o-TDA polyol, for a 22 percent EO o-TDA Polyol blend comprising 70 percent of the total polyols present.

TABLE 9

| | 11 |
|---|---|
| Isocyanate-Reactive Component (parts by weight) | |
| Polyol A | 35 |
| Polyol C | 35 |
| Polyol E | 15 |
| Polyol F | 15 |
| Catalyst Mixture[1] | 3.00 |
| Surfactant[2] | 2.5 |
| Water | 1.35 |
| HFC-245fa | 33.30 |
| Mole Ratio, HFC-245fa/Water | 75/25 |
| Isocyanate Component | |
| Polymeric MDI[3] | 136.38 |
| Isocyanate Index | 1.20 |
| Ratio[4] | 1.025 |

[1-4]See notes 1-4, Table 1.

The resulting foam is made and evaluated as described in Example 1 with the results as indicated in Table 10.

TABLE 10

| Property, units | Ex. 11 |
|---|---|
| Gel time, seconds | 32 |
| k-factor, 10 percent overpacked, BTU-in/ft$^2$-hr-° F. (W m$^{-1}$ K$^{-1}$) | 0.132 (.0190) |
| Free rise density, pcf (kg/m$^3$) | 1.34 (21.47) |
| Minimum Fill Density, pcf (kg/m$^3$) | 1.93 (30.92) |
| Compressive Strength, psi (kPa) | 20.0 (137.90) |
| Demold expansion, 3 min @ 10 percent overpacking, inches | 0.075 |

Example 11 demonstrates using a polyol with a higher EO content, the demold expansion is higher than what is observed for Examples 1-3, but still within commercial limits.

What is claimed is:

1. An isocyanate-reactive composition comprising
   (a) an isocyanate-reactive component containing a polyol or mixture thereof having an average hydroxyl number of from 300 to 600 and an average of at least 3 hydroxyl groups/molecule, (b) an effective amount of a physical blowing agent selected from the group consisting of hydrofluorocarbons having from 2 to 4 carbon atoms and (c) from 0.1 to 4 parts by weight water per 100 parts by weight of the polyol or mixture thereof, wherein at least 10 percent by weight of said polyol or mixture thereof is one or more hydroxyl group containing toluene diamine-initiated polyethers, the toluene diamine-initiated polyether(s) have an average hydroxyl number of from 300 to 600, at least 80% of the hydroxyl groups on the toluene diamine-initiated polyether(s) are secondary hydroxyl groups, and oxyethylene groups constitute 3 to 20 percent of the total weight of the toluene diamine initiated polyether(s).

2. The composition of claim 1, wherein the physical blowing agent is selected from HFC 134A, HFC 245fa, HFC 365mfc and mixtures thereof.

3. An isocyanate-reactive composition comprising
   (a) an isocyanate-reactive component containing a polyol or mixture thereof having an average hydroxyl number of from 300 to 600 and an average of at least 3 hydroxyl groups/molecule, (b) an effective amount of a physical blowing agent selected from the group consisting of alkanes having 3-6 carbon atoms and cycloalkanes having 5-6 carbon atoms, or a mixture of any two or more of the foregoing physical blowing agents and (c) from 0.1 to 4 parts by weight water per 100 parts by weight of the polyol or mixture thereof, wherein at least 10 percent by weight of said polyol or mixture thereof is one or more hydroxyl group containing toluene diamine-initiated polyethers, the toluene diamine-initiated polyether(s) have an average hydroxyl number of from 300 to 600, at least 80% of the hydroxyl groups on the toluene diamine-initiated polyether(s) are secondary hydroxyl groups, and oxyethylene groups constitute 3 to 20 percent of the total weight of the toluene diamine initiated polyether(s).

4. The composition of claim 1 or 3, wherein the toluene diamine is at least 50 percent by weight the 2,3-isomer.

5. The composition of claim 4, wherein the toluene diamine-initiated polyether(s) constitute at least 50 percent by weight of the polyol or mixture thereof.

6. The composition of claim 5, wherein the toluene diamine-initiated polyether(s) have an average oxyethylene group content of 6 to 12 percent by weight.

7. The composition of claim 6, wherein the toluene diamine-initiated polyether(s) constitute at least 80 percent by weight of the polyol or mixture thereof.

8. A method of making a polyurethane foam, comprising (1) forming a reaction mixture by mixing, under reaction conditions,
   (a) an isocyanate-reactive component containing a polyol or mixture thereof having an average hydroxyl number of from 300 to 600 and an average of at least 3 hydroxyl groups/molecule with
   (b) an isocyanate-component containing a polyisocyanate that is reactive with the polyol or mixture thereof,
   in the presence of an effective amount of physical blowing agent selected from the group consisting of hydrofluorocarbons having from 2 to 4 carbon atoms, alkanes having 3-6 carbon atoms and cycloalkanes having 5-6 carbon atoms, or a mixture of any two or more of the foregoing physical blowing agents, and from 0.1 to 4 parts by weight water per 100 parts by weight of the polyol or mixture thereof, and (2) subjecting the reaction mixture to conditions such that it reacts, expands and cures within an enclosed space to form a rigid polyurethane foam within said enclosed space,
   wherein at least 10 percent by weight of said polyol or mixture thereof is one or more hydroxyl group containing, toluene diamine-initiated polyethers, wherein the toluene diamine-initiated polyether(s) have an average hydroxyl number of from 300 to 600, at least 80% of the hydroxyl groups on the toluene diamine-initiated polyether(s) are secondary hydroxyl groups, and further wherein oxyethylene (—CH$_2$—CH$_2$—O—) groups constitute 3 to 20 percent of the total weight of the toluene diamine initiated polyether(s).

9. The method of claim 8, wherein the physical blowing agent is selected from HFC 134A, HFC 245fa, HFC 365mfc and mixtures thereof.

10. The method of claim 8, wherein the toluene diamine is at least 50 percent by weight the 2,3-isomer.

11. The method of claim 8, wherein the toluene diamine-initiated polyether(s) constitute at least 50 percent by weight of the polyol or mixture thereof.

12. The method of claim 11, wherein the toluene diamine-initiated polyether(s) have an average oxyethylene group content of 6 to 15 percent by weight.

13. The method of claim 12, wherein the toluene diamine-initiated polyether(s) constitute at least 80 percent by weight of the polyol or mixture thereof.

14. The method of claim 8, wherein the isocyanate-reactive component and the isocyanate component are mixed in the presence of a surfactant and a catalyst.

15. The method of claim 8, wherein the enclosed space is a wall of a freezer, refrigerator or cooler.

16. The method of claim 8, wherein the toluene diamine-initiated polyether has internal poly(oxyethylene) blocks or internal randomly polymerized ethylene oxide/propylene oxide blocks, that are capped with an all-propylene oxide block.

17. The isocyanate-reactive composition of claim 1 or 3, wherein the toluene diamine-initiated polyether has internal poly(oxyethylene) blocks or internal randomly polymerized ethylene oxide/propylene oxide blocks, that are capped with an all-propylene oxide block.

* * * * *